United States Patent [19]

Hitch

[11] Patent Number: 4,924,766
[45] Date of Patent: May 15, 1990

[54] ROTISSERIE ASSEMBLY

[75] Inventor: Robert J. Hitch, Columbus, Ga.

[73] Assignee: W. C. Bradley Company, Columbus, Ga.

[21] Appl. No.: 253,051

[22] Filed: Oct. 4, 1988

Related U.S. Application Data

[63] Continuation-in-part of Ser. No. 455, Jan. 5, 1987.

[51] Int. Cl.$^5$ .................. A47J 37/04; A47J 37/07
[52] U.S. Cl. .................. 99/421 HV; 99/419; 99/421 H
[58] Field of Search .......... 99/419, 421 R, 421 H, 99/421 HV, 421 V

[56] References Cited

U.S. PATENT DOCUMENTS

| | | | |
|---|---|---|---|
| 2,046,352 | 7/1936 | Warner | 99/421 HV |
| 2,505,976 | 5/1950 | Leon | 99/421 HV |
| 2,961,942 | 11/1960 | Terry | 99/421 HV |
| 3,247,779 | 4/1966 | Willman | 99/421 HV |
| 3,248,518 | 4/1966 | Ogle, Jr. et al. | 99/421 HV |
| 3,742,839 | 7/1973 | Maley | 99/421 HV |

FOREIGN PATENT DOCUMENTS 1231595  9/1960  France ............. 99/421 H

Primary Examiner—Stephen Marcus
Assistant Examiner—Christine A. Peterson
Attorney, Agent, or Firm—Thomas & Kennedy

[57] ABSTRACT

A rotisserie assembly for barbecue grills is disclosed in which the motor support bracket can be arranged to support the motor in a plurality of vertically adjusted positions and the rod support bracket includes a plurality of slots for receiving the rotisserie rod. The motor bracket includes an adapter plate that can be inverted for providing two adjusted positions and which can be omitted for providing a third position.

7 Claims, 3 Drawing Sheets

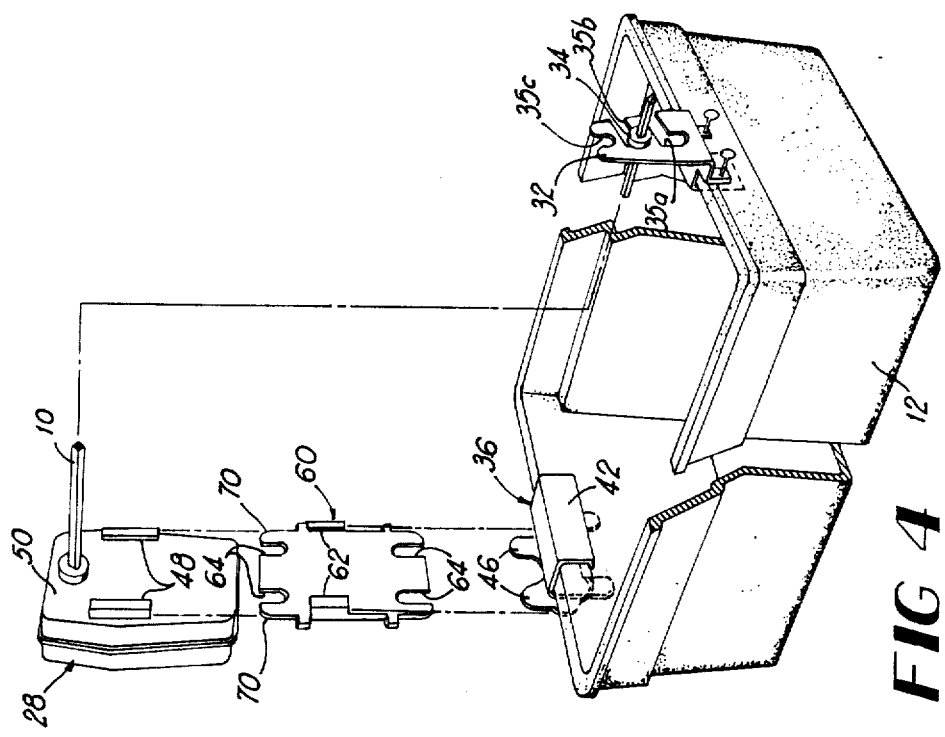
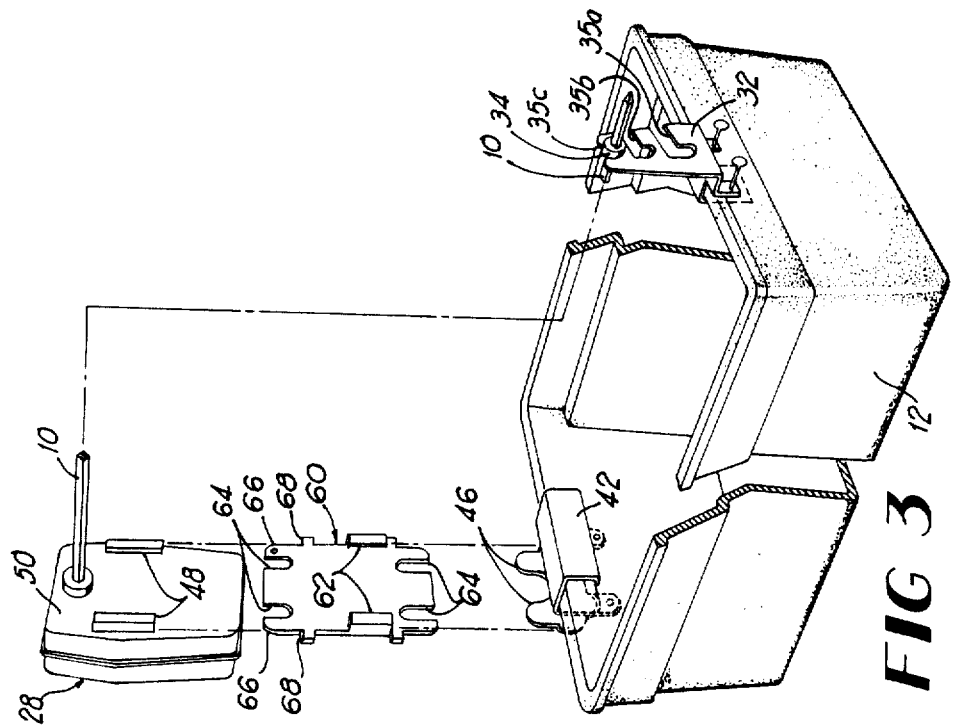

ROTISSERIE ASSEMBLY

This application is a continuation-in-part of application Ser. No. 000,455, filed Jan. 5, 1987.

BACKGROUND OF THE INVENTION

Rotisserie units are often used to cook food, the units having a rod which receives the food and is suspended over a barbecue grill or pit or with a similar arrangement. The rotisserie rod is rotatable either with a motor or a hand crank and the food is normally cooked by causing the rod to slowly rotate the food over the coals or other cooking mediums. A typical arrangement may have the rotisserie rod suspended over a bed of coals, with one end secured to the motor shaft and rotatable therewith, and the other end supported for rotation by a bracket or the like.

In general, the rotisserie rod is greater in length than the firebox or pit, with the ends supported from the edges of the firebox or by stands at the edges of the pit, and the food disposed generally centrally on the suspended rod. As such, the rods are normally quite long, precluding easy storage or cleaning in a dishwasher, and even making hand washing of the rod after use a difficult project. The brackets or other means used to hold the motor and suspend the rods are normally set a fixed height, thus requiring adjustment of the heat source as opposed to adjustment of the height of the food above the heat source to vary the level of heat, cooking time, etc.

SUMMARY OF THE INVENTION

It is therefore, one of the principal objects of the present invention to provide a modular rotisserie rod assembly that is easily supported over a firebox or barbecue pit for cooking food thereon, and which is impervious to the intense heat generated by the burner or coals.

Another object of the present invention is to provide a modular rotisserie rod assembly that can be easily disassembled into several shorter members and which is easily reassembled to its operative length.

A further object of the present invention is to provide a rotisserie support bracket assembly by which the rotisserie motor and the rod assembly can be mounted in a plurality of vertically adjusted positions and in which the adjustments are quickly and easily made.

A still further object of the present invention is to provide a rotisserie support bracket assembly in which the bracket members are quickly and inexpensively produced, as in a stamping operation, and are durable for providing a long service life.

These and additional objects are attained by the present invention which relates to a rotisserie assembly for barbecue grills including a modular rotisserie rod assembly and a rotisserie support bracket assembly for holding the motor and the rod assembly. The rod assembly includes right and left rod members joined with a coupling means. The bracket assembly includes a motor support bracket means and a rod support bracket means, which together provide a plurality of vertically adjusted positions for suspending the food being cooked over the heat source. Both bracket means include mounting means for connection to the fire box of a barbecue grill, which mounting means are adjustable to accommodate castings having differing shapes. The bracket means are easily mounted and the adjustments to different heights are quickly and easily made.

Various additional objects and advantages of the present invention will become apparent from the following detailed description, with reference to the accompanying drawings.

BRIEF DESCRIPTION OF THE DRAWINGS

FIG. 3 is a fragmentary perspective view of the present assembly, with an exploded view of the motor support bracket;

FIG. 4 is a fragmentary perspective view of the present assembly similar to that shown in the preceding figure, illustrating a different mounting position.

DETAILED DESCRIPTION OF THE PREFERRED EMBODIMENT

Figure 1:
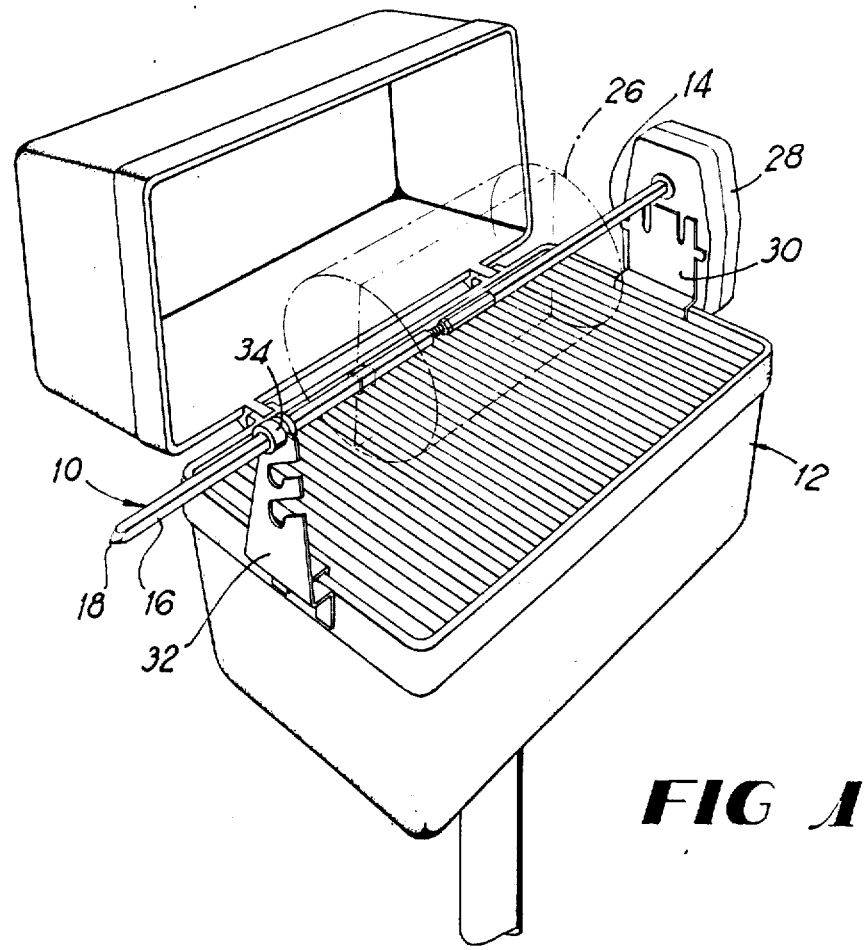
FIG. 1 is a perspective view of the present rotisserie assembly, shown in installed position on a barbecue grill.
Figure 2:
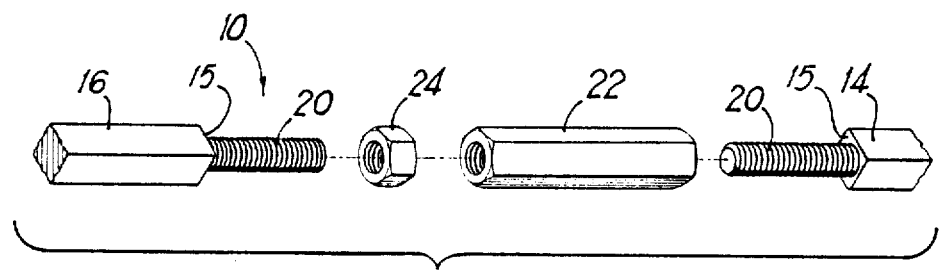
FIG. 2 is a partial, exploded view of the modular rod assembly.

Referring now more specifically to the drawings, and to FIG. 1 in particular, numeral 10 designates generally the rotisserie rod assembly, shown in installed position over the firebox 12 of a barbecue grill. The rod assembly includes right and left identical rod members 14 and 16, respectively, each being generally square in cross section, although a rectangular shape may also be employed. The square or rectangular shape offers resistance to the turning of food skewered directly onto the rods, as for example, where an entire chicken is disposed on the rod. The outer tips 18 of the rod members are pointed, thereby facilitating their penetration of food to be mounted thereon.

The opposite or inner ends 20 of the rods are threaded for receiving a connecting means such as collar 22 by which the rod members are secured together. Threadedly mounted adjacent collar 22 is an adjustment means such as jam nut 24. The collar 22 and the nut 24 are hexagonal, the hexagonal stock being easily tightened with a wrench, pliers, etc. In addition, the connection can be made using stock pieces having a relatively small diameter, and the stock is readily available. Other multi-faceted connectors may also be used for the connector and nut, the disclosure not being meant to limit the number of facets.

The rod assembly may also be used for mounting accessories, an example being the food tumbling basket 26, shown in broken lines in FIG. 1. Such accessories normally have mounting means of rectangular cross section which conform to the facets of the rod in order for the accessories to rotate therewith as the rod turns. Thus, in order to slide the basket or similar structures over the connector, the jam nut is used to align the facets of the rod with those of the connector, while at the same time tightening the assembly. Normally, at least two adjacent facets of the hexagonal connector and nut must be aligned with two of the sides of the mounting means of the accessory and the rod members, the slack in the other directions being taken up by a set screw or similar means.

For operation, the rod has one end secured in the rotisserie motor 28, the motor being mounted on the side of the grill box with bracket 30. The opposite end of the rod is held by a rod support bracket 32, this bracket having a plurality of slots by which the relative vertical height of the rod may be adjusted. A circular ferrule or collar 34 is disposed around the rod where it contacts the bracket 32 for facilitating rotation in the semi-circular depressions of the adjustment bracket.

The present modular rotisserie rod affords a number of advantages over prior art, one piece rods. The one piece rods are difficult to clean due to their length, while the present assembly can be broken down and cleaned in an automatic dishwasher. Storage and transport of the present modular assembly are also much easier than with the relatively long one-piece rod. The modular assembly is also safer to handle then a long, one-piece rod in that it is much easier to control when moving the rod assembly from one place to another in its disassembled state.

Referring now in particular to FIGS. 3 through 6, an alternate embodiment of the motor support bracket means 30 is illustrated in detail. Bracket 30 is a single-height bracket, thus if it were desirable to lower the rotisserie rod, a different bracket (not shown) would be installed with the motor 28 then connected thereto. With the alternate embodiment shown in FIGS. 3 through 6, mounting and height adjustment of the motor 28 is greatly facilitated and the rod may simply be transferred from one of the slots 35a, 35b, 35c in the rod support bracket 32 with appropriate adjustment of the motor support bracket assembly.

Figure 5:
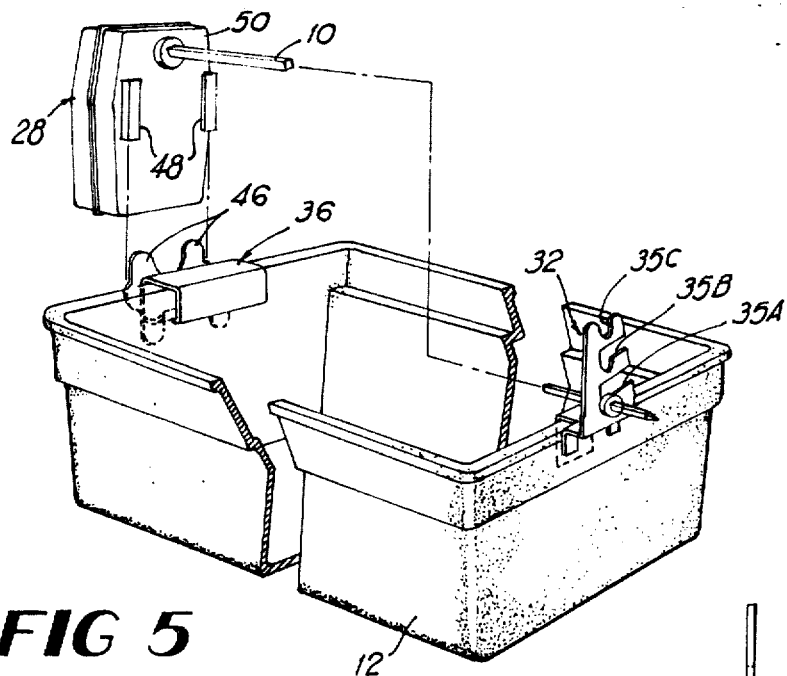
FIG. 5 is a fragmentary perspective view of the present assembly similar to that shown in the preceding figure, illustrating another mounting position.
Figure 6:
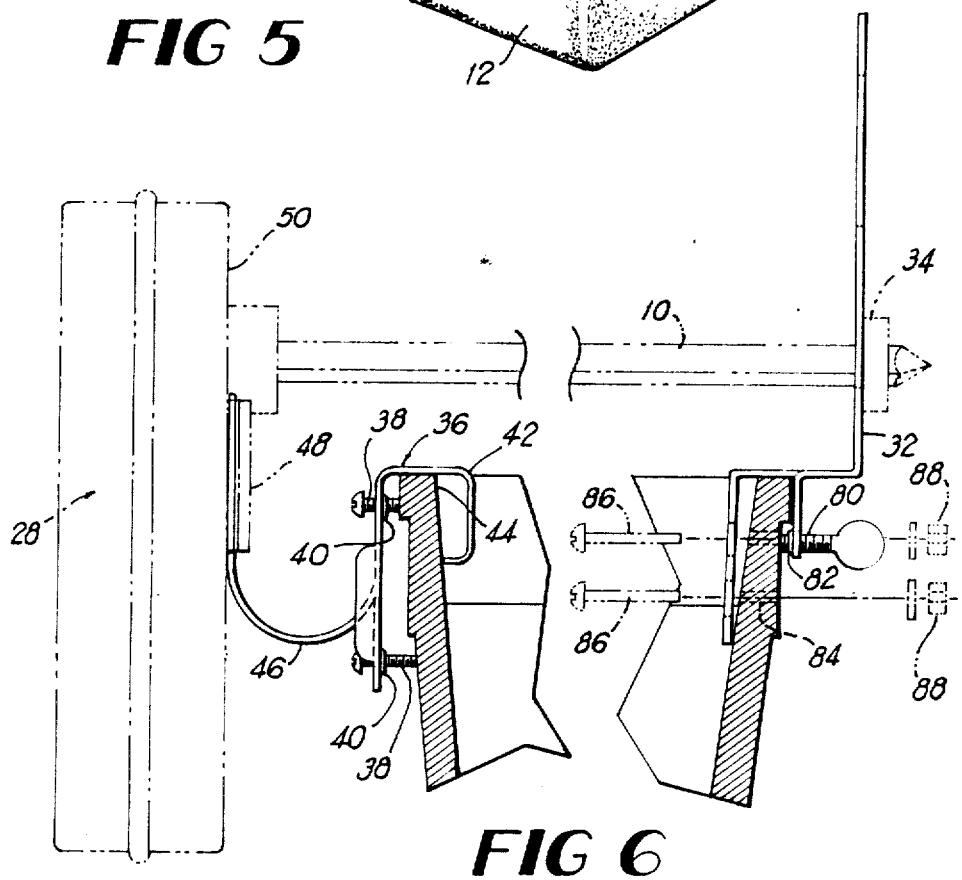
FIG. 6 is a fragmentary, side elevational view, shown partially in cross section and partially in phantom lines illustrating the mounting of the bracket means.

Briefly, FIG. 3 illustrates the positioning of the motor support bracket assembly where the rotisserie rod is in the uppermost position, FIG. 4 illustrates the arrangement used for the intermediate position, and FIGS. 5 and 6 illustrate the arrangement used for the lowest position. The bracket assembly is normally formed from aluminum blanks in a stamping operation; however, other suitable materials and manufacturing operations may also be used.

In each of the aforementioned positions, the motor holding bracket 36 is mounted on the side of the firebox 12, using suitable securing means such as screws 38. The screws are inserted and threaded through grommets 40 or the like and are also used to level the bracket 36 against the firebox, as illustrated in FIG. 6. The bracket is further secured by the engagement of the upper portion of the bracket, which is formed as a hook means 42, over the upper rim 44 of the firebox. Bracket 36 also includes generally U-shaped arm means 46, which extend outwardly from the firebox and receive the motor 28 for mounting in the lowest position, shown in FIG. 5 or which receive an adapter plate 60, as shown in FIGS. 3 and 4.

Motor 28 includes spaced right angular clips 48 on the inside wall 50 thereof which extend outwardly therefrom and then parallel thereto, forming a recess therebetween for receiving arms 46. Thus, with the arms 46 inserted in the clips 48, the motor is releasably secured on bracket 36 in position for disposing rod 10 in the lowest mounted position, the collar 34 being journalled in the lowermost slot 35a, again, as shown in FIGS. 5 and 6.

FIGS. 3 and 4 illustrate the use of the adapter plate 60 which is used for mounting the motor in the uppermost and the intermediate positions. The adapter plate uses the same system as detailed hereinabove for mounting the motor, utilizing spaced clips 62 which are offset from the centerline of the plate 60. The plate 60 also includes slot means 64, formed in both ends thereof, which are designed to accommodate the screws 38 used for mounting bracket 36, should they project out from the wall of the firebox far enough to be in line with the plate 60 as it is mounted.

Referring in particular to FIG. 3, the plate 60 disposed with clips 62 below the centerline of the plate, the clips receiving arms 46 for mounting the plate. In this position, the longer portion of the plate is disposed above the arms 46. The uppermost end of the plate 60, thus includes upstanding arm means 66 which are defined at their lower end by outboard stops 68. Thus, as shown, the motor is disposed at a level in which the rod 10 rests in the uppermost slot 35c in bracket 32.

Referring now in particular to FIG. 4, the adapter plate is inverted such that clips 62 are above the centerline of the plate 60, disposing the longer portion of the plate below arms 46. In this position, the uppermost end of the plate also includes upstanding arm means 70, defined at their lower end by stops 72. When the motor is mounted arms 70 engage motor clips 48 which in turn bear against stops 72. Thus, as shown, the motor is disposed at a level in which the rod 10 is received in the intermediate slot 35b of bracket 32.

FIG. 6 also illustrates the securement of bracket 32 to the firebox. If the casting is solid walled, securement is similar to that used for the opposed, motor holding bracket 36, with screws 80 or the like being threaded through grommets 82 or the like and against the outer wall of the firebox. Where holes 84 are provided through the firebox wall, screws 86 or similar fasteners are inserted therethrough and secured, as with nuts 88.

Thus, a rotisserie assembly is provided in which the height of the rotisserie rod above the heat source is easily and quickly changed for varying cooking times and/or the degree of heat which is transmitted to the food. The use and operation of the present assembly are substantially as described hereinabove.

While an embodiment of a rotisserie assembly and modifications thereof have been shown and described in detail herein, various additional changes and modifications may be made without departing from the scope of the present invention.

We claim:

1. A rotisserie assembly for suspending food over a firebox of a barbecue grill having a heat source for cooking the food, said assembly comprising a motor for said assembly having a power source and spaced, opposing, clip means, a motor support bracket secured to one side of said firebox with a plurality of securing means disposed therethrough and against said firebox for leveling said motor support bracket thereon, said motor support bracket also having spaced arm means offset from said motor support bracket and extending outwardly therefrom for receiving said clip means of said motor, a rod support bracket secured to another side of said firebox opposite said motor support bracket, and a rod means having one end rotatably connected to said motor with an opposite end being received in said rod support bracket.

2. In a rotisserie assembly having a motor and a rotisserie rod installed therein for rotation over the firebox of a barbecue grill, the improvement comprising a bracket assembly for supporting said motor and said rod in a plurality of vertically adjusted positions, including a motor support bracket secured to one side of said firebox having arm means extending upwardly therefrom, an adapter plate having clip means for receiving said arm means and supporting said adapter plate on said motor support bracket, said plate also including integral arm means extending upwardly therefrom, said motor having clip means for receiving said second mentioned arm means of said adapter plate for supporting said motor thereon, and a rod support bracket having a plurality of vertically spaced slots for selectively receiving said rotisserie rod.

3. In a rotisserie assembly as defined in claim 2 wherein said adapter plate includes stop means near the bottom of said second mentioned arm means for supporting said clip means of said motor and holding said motor in a selected position.

4. In a rotisserie assembly as defined in claim 2 wherein said clip means of said adapter plate are offset from the centerline of said adapter plate and said adapter plate has two position, a first position in which said adapter plate is mounted with said clip means above said centerline for suspending said motor and said rod in an intermediate one of said slots, and a second position in which said adapter plate is mounted with said clip means below said centerline for suspending said motor and said rod in the uppermost of said slots.

5. A vertically adjustable rotisserie assembly for use in suspending food over the firebox of a barbecue grill, said assembly including a motor with clip means for use in supporting said motor and a power source therefor, a rotisserie rod for receiving and suspending food, said rod being rotatably mounted in said motor, the improvement comprising a motor support bracket assembly secured to one side of said firebox for supporting said motor and a rod support bracket secured to the opposite side of said firebox and having a plurality of vertically spaced slots for receiving said rod, said motor support bracket assembly including a motor support bracket with arm means extending outwardly therefrom for receiving said clip means on said motor for mounting said motor in a first, lower position, an adapter plate having clip means disposed thereon and having a first mounted position in which said adapter plate clip means are disposed above the centerline of said adapter plate and are received by said arm means for mounting said rod in an intermediate position, and a second, inverted mounted position in which said clip means are disposed below the centerline of said plate for mounting said rod in the uppermost of said slots.

6. A rotisserie assembly as defined in claim 5 in which said adapter plate includes vertically projecting arm means extending from both ends thereof for receiving said clip means of said motor.

7. In a rotisserie assembly as defined in claim 2 wherein said adapter plate includes stop means near the bottom of said second mentioned arm means for supporting said clip means of said motor and holding said motor in a selected position.

* * * * *